US011254616B2

(12) United States Patent
Zhamu et al.

(10) Patent No.: US 11,254,616 B2
(45) Date of Patent: Feb. 22, 2022

(54) METHOD OF PRODUCING INTEGRAL 3D HUMIC ACID-CARBON HYBRID FOAM

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 1339 days.

(21) Appl. No.: 15/228,133

(22) Filed: Aug. 4, 2016

(65) Prior Publication Data

US 2018/0037458 A1 Feb. 8, 2018

(51) Int. Cl.
*C04B 35/524* (2006.01)
*C04B 38/00* (2006.01)
(Continued)

(52) U.S. Cl.
CPC .......... *C04B 35/524* (2013.01); *B29C 67/202* (2013.01); *C01B 32/20* (2017.08); *C01B 32/382* (2017.08); *C04B 35/522* (2013.01); *C04B 35/528* (2013.01); *C04B 35/62272* (2013.01); *C04B 35/62839* (2013.01); *C04B 35/63496* (2013.01); *C04B 38/0022* (2013.01); *D01F 9/14* (2013.01); *B29K 2101/12* (2013.01); *B29K 2105/251* (2013.01); *B29L 2031/00* (2013.01); *C04B 2235/483* (2013.01); *C04B 2235/528* (2013.01); *C04B 2235/5276* (2013.01); *C04B 2235/6567* (2013.01); *C04B 2235/661* (2013.01); *C04B 2235/77* (2013.01); *C04B 2235/9607* (2013.01)

(58) Field of Classification Search
CPC .................. C04B 38/0022; C04B 35/524
See application file for complete search history.

(56) References Cited

U.S. PATENT DOCUMENTS 3,671,427 A   6/1972  Andrews, Jr. et al.
4,568,412 A   2/1986  Atkins, Jr. et al.
(Continued)

FOREIGN PATENT DOCUMENTS

CN    1230972 A    10/1999
CN  101798465 A     8/2010
(Continued)

OTHER PUBLICATIONS

Pólrolniczak, Paulina. 'Humic Acid-Derived Mesoporous Carbon as Cathode Component for Lithium-Sulfur Battery,' International Journal of Electrochemical Science, 10 (2015), 9370-9378. (Year: 2015).*

(Continued)

*Primary Examiner* — Galen H Hauth
*Assistant Examiner* — Asha A Thomas

(57) ABSTRACT

Provided is a method of producing an integral 3D humic acid-carbon hybrid foam, comprising: (A) forming a solid shape of humic acid-polymer particle mixture; and (B) pyrolyzing the solid shape of humic acid-polymer particle mixture to thermally reduce humic acid into reduced humic acid sheets and thermally convert polymer into pores and carbon or graphite that bonds the reduced humic acid sheets to form the integral 3D humic acid-carbon hybrid foam.

13 Claims, 11 Drawing Sheets

(51) Int. Cl.
| | |
|---|---|
| C04B 35/528 | (2006.01) |
| D01F 9/14 | (2006.01) |
| C04B 35/52 | (2006.01) |
| C04B 35/622 | (2006.01) |
| C04B 35/634 | (2006.01) |
| C04B 35/628 | (2006.01) |
| B29C 67/20 | (2006.01) |
| C01B 32/20 | (2017.01) |
| C01B 32/354 | (2017.01) |
| B29L 31/00 | (2006.01) |
| B29K 101/12 | (2006.01) |
| B29K 105/00 | (2006.01) |

(56) References Cited

U.S. PATENT DOCUMENTS

| | | |
|---|---|---|
| 5,688,999 A | 11/1997 | Lebo et al. |
| 6,872,330 B2 | 3/2005 | Mack |
| 6,913,154 B2 | 7/2005 | Koslow |
| 7,022,176 B1 | 4/2006 | Inoue et al. |
| 7,071,258 B1 | 7/2006 | Jang |
| 7,327,000 B2 | 2/2008 | DeHeer |
| 7,623,340 B1 | 11/2009 | Song |
| 7,758,842 B2 | 7/2010 | Nishikawa et al. |
| 7,948,739 B2 | 5/2011 | Zhamu |
| 8,105,565 B2 | 1/2012 | Nishikawa et al. |
| 9,053,870 B2 | 6/2015 | Yu et al. |
| 9,233,850 B2 | 1/2016 | Jang et al. |
| 9,437,372 B1 | 9/2016 | Zhamu et al. |
| 2002/0085968 A1 | 7/2002 | Smalley et al. |
| 2003/0034295 A1* | 2/2003 | Strano ............... C04B 38/0022 210/483 |
| 2003/0108785 A1* | 6/2003 | Wu ..................... H01G 9/155 423/445 R |
| 2004/0013942 A1 | 1/2004 | Fukumoto et al. |
| 2005/0271547 A1 | 12/2005 | Gerber et al. |
| 2005/0271574 A1 | 12/2005 | Jang |
| 2007/0209506 A1* | 9/2007 | Liu ..................... B01D 53/228 95/45 |
| 2008/0048152 A1 | 2/2008 | Jang |
| 2008/0248275 A1 | 10/2008 | Jang et al. |
| 2009/0061312 A1 | 3/2009 | Zhamu |
| 2009/0095942 A1 | 4/2009 | Yamaguchi et al. |
| 2010/0021819 A1 | 1/2010 | Zhamu |
| 2010/0035093 A1 | 2/2010 | Ruoff et al. |
| 2010/0085713 A1 | 4/2010 | Balandin et al. |
| 2010/0140792 A1 | 6/2010 | Haddon et al. |
| 2011/0108978 A1 | 5/2011 | Kim et al. |
| 2011/0159372 A1 | 6/2011 | Zhamu et al. |
| 2011/0165321 A1 | 7/2011 | Zhamu et al. |
| 2011/0165466 A1 | 7/2011 | Zhamu et al. |
| 2011/0201739 A1 | 8/2011 | Beall |
| 2011/0243830 A1 | 10/2011 | Ozaki et al. |
| 2011/0262377 A1 | 10/2011 | McKay et al. |
| 2012/0021250 A1 | 1/2012 | Lee et al. |
| 2012/0088154 A1 | 4/2012 | Liu et al. |
| 2013/0005013 A1 | 1/2013 | Sabbah et al. |
| 2013/0095389 A1 | 4/2013 | Bhardwaj et al. |
| 2013/0112925 A1 | 5/2013 | Beall |
| 2013/0140495 A1 | 6/2013 | Beall |
| 2013/0141774 A1 | 6/2013 | McCarthy |
| 2013/0171339 A1 | 7/2013 | Wang et al. |
| 2013/0224603 A1 | 8/2013 | Chen et al. |
| 2014/0030590 A1 | 1/2014 | Wang et al. |
| 2014/0030636 A1 | 1/2014 | Zhao et al. |
| 2014/0110049 A1 | 4/2014 | Yuen et al. |
| 2014/0234702 A1 | 8/2014 | Zhang et al. |
| 2014/0335420 A1 | 11/2014 | Yamamoto et al. |
| 2014/0371443 A1 | 12/2014 | Seo et al. |
| 2015/0044364 A1 | 2/2015 | Katayama et al. |
| 2015/0084603 A1 | 3/2015 | Thillaiyan et al. |
| 2015/0086881 A1 | 3/2015 | Zhamu et al. |
| 2015/0118554 A1 | 4/2015 | Wu et al. |
| 2015/0218003 A1 | 8/2015 | Zhamu et al. |
| 2015/0259212 A1 | 9/2015 | Li et al. |
| 2016/0043384 A1 | 2/2016 | Zhamu et al. |
| 2016/0079001 A1 | 3/2016 | Lin et al. |
| 2016/0118668 A1 | 4/2016 | DuPasquier et al. |
| 2016/0240840 A1 | 8/2016 | He et al. |

FOREIGN PATENT DOCUMENTS

| | | |
|---|---|---|
| CN | 103641117 A | 3/2014 |
| CN | 104600320 A | 5/2015 |
| CN | 103752281 B | 4/2016 |
| CN | 104900876 B | 5/2017 |
| GB | 317496 A | 8/1929 |
| GB | 2103633 B | 7/1983 |
| JP | 58117649 | 7/1983 |
| JP | S58173138 A | 10/1983 |
| JP | S59100168 A | 6/1984 |
| JP | 61275116 | 12/1986 |
| WO | 2012151880 A1 | 11/2012 |

OTHER PUBLICATIONS

Bor Z. Jang and A. Zhamu, "Processing of Nano Graphene Platelets (NGPs) and NGP Nanocomposites: A Review," J. Materials Sci. 43 (2008) 5092-5101.

William S. Hummers, Jr., et al., Preparation of Graphitic Oxide, Journal of the American Chemical Society, 1958, p. 1339.

Yang, et al. "Two-dimensional Graphene Nano-ribbons," J. Am. Chem. Soc. 130 (2008) 4216-17.

Y. Xu, et al. "Self-Assembled Graphene Hydrogel via a One-Step Hydrothermal Process," ACS Nano 2010, 4, 4324-4330.

Zongping Chen, et al., "Three-dimensional flexible and conductive interconnected graphene networks grown by chemical vapour deposition," Nature Materials, 10 (Jun. 2011) 424-428.

B. G. Choi, et al., "3D Macroporous Graphene Frameworks for Supercapacitors with High Energy and Power Densities," ACS Nano, 6 (2012) 4020-4028.

Stevenson F.J. "Humus Chemistry: Genesis, Composition, Reactions," John Wiley & Sons, New York 1994.

Anderson et al., "The Use of Esters of N-Hydroxysuccinimide in Peptide Synthesis" J. Amer. Chem. Soc. (1964) vol. 86, No. 9, pp. 1839-1842.

CN 103641117a, Google Patent English language translation, 5 pages.

CN 103752281B, Google Patent English language translation, 8 pages.

CN 104600320A Google Patent English Translation, 6 pages.

CN 1230972A, Google Patents English language translation, 22 pages.

CN104600320A—English language translation from Google Patent—htttps://patents.google.com/patent/CN104600320A/en, 6 pages.

Gwon et al., "Flexible energy storage devices based on graphene paper" Energy and Environmental Science (2011) vol. 4, pp. 1277-1283.

Ji et al., "A highly ordered nanostructured carbon-sulphur cathode for lithium-sulphur batteries" Nature Materials (2009) vol. 8, pp. 500-506.

Katsumi et al., "Evaluation of stacking nanostructure in soil humic acids by analysis of the 002 band of their X-ray diffraction profiles" Soil Science and Plant Nutrition (2015) vol. 61, No. 4, pp. 603-612.

PCT/US17/18708 International Search Report and Written Opinion dated Jun. 6, 2017, 11 pages.

PCT/US17/18708 International Search Report and Written Opinion dated Jun. 6, 2017, 12 pages.

PCT/US17/36032 International Search Report and Written Opinion dated Aug. 25, 2017, 11 pages.

PCT/US17/43494 International Search Report and Written Opinion dated Sep. 27, 2017, 15 pages.

PCT/US17/43619 International Search Report and Written Opinion dated Oct. 18, 2017, 18 pages.

Polrolniczak et al., "Humic Acid-Derived Mesoporous Carbon as Cathode Component for Lithium-Sulfur Battery" Int. J. Electrochem. Sci. (2015) vol. 10, pp. 9370-9378.

(56) References Cited

OTHER PUBLICATIONS

Porada et al., "Review on the science and technology of water desalination by capacitive deionization" Progress in Materials Science (2013) vol. 58, pp. 1388-1442.
Powell et al., "Graphene Oxide and graphene from low grade coal: Synthesis, characterization and applications" Current Opinion in Colloid & Interface Science (2015) vol. 20, No. 5, pp. 362, 365-366.
Prabakar et al., "Graphene oxide as a corrosion inhibitor for the aluminum current collector in lithium ion batteries" Carbon (2013) vol. 52, pp. 128-136.
U.S. Appl. No. 15/243,589 Nonfinal Office Action dated Nov. 16, 2017, 8 pages.
U.S. Appl. No. 15/243,589 Response Nonfinal Office Action dated Nov. 22, 2017, 11 pages.
U.S. Appl. No. 15/251,849 Nonfinal Office Action dated Nov. 1, 2017, 21 pages.
U.S. Appl. No. 15/270,868 Nonfinal Office Action dated Nov. 1, 2017, 23 pages.
Rice et al., "Statistical evaluation of the elemental composition of humic substances" Org. Geochem. (1991) vol. 17, No. 5, pp. 635-648.
Duraia et al., "Reduced humic acid nanosheets and its uses as nanofiller" J. Phys. Chem. Solids (2015) vol. 85, pp. 86-90.
Wang et al., "Graphene-coated plastic film as current collector for lithium/sulfur batteries" J. Power Source (2013) vol. 239, pp. 623-627.
WO 2012151880A1—English language translation from Google Patent—https://patents.google.com/patent/WO2012151880A1/en, 15 pages.
Wunderwald et al., "Formation and degradation of a synthetic humic acid derived from 3-fluorocatechol" Applied Microbiology and Biotechnology (2000) vol. 53, No. 4, p. 441.
Xi et al., "Binder free three-dimensional sulphur/few-layer graphene foam cathode with enhanced high-rate capability for rechargeable lithium sulphur batteries" Nanoscale (2014) vol. 6, No. 11, pp. 5746-5753.
PCT/US17/43284 International Search Report dated Oct. 12, 2017, 7 pages.
El-Shazly et al., "Reduced humic acid nanosheets and its uses as nanofiller" Journal of Physics and Chemistry of Solids (2015) vol. 85, pp. 86-90.
Franklin 1951.
Gomes de Melo 2015.
Speight 2017 Rules of Thumb for Petroleum Engineers.
U.S. Appl. No. 15/240,537 Final Office Action dated Oct. 10, 2019, 7 pages.
U.S. Appl. No. 15/240,537 Non-final Office Action dated Apr. 4, 2019, 11 pages.
U.S. Appl. No. 15/243,606 Nonfinal Office Action dated May 2, 2019, 15 pages.
U.S. Appl. No. 15/251,841 Nonfinal Office Action dated Jan. 2, 2019, 5 pages.
U.S. Appl. No. 15/251,841 Nonfinal Office Action dated Jul. 1, 2019, 7 pages.
U.S. Appl. No. 15/251,849 Final Office Action dated Jul. 25, 2019, 14 pages.
U.S. Appl. No. 15/251,857 Final Office Action dated Aug. 27, 2020, 42 pages.
U.S. Appl. No. 15/251,857 Final Office Action dated Nov. 13, 2019, 42 pages.
U.S. Appl. No. 15/251,857 Nonfinal Office Action dated Apr. 3, 2020, 42 pages.
U.S. Appl. No. 15/251,857 Nonfinal Office Action dated Feb. 4, 2021, 51 pages.
U.S. Appl. No. 15/251,857 Nonfinal Office Action dated May 29, 2019, 37 pages.
U.S. Appl. No. 15/270,868 Final Office Action dated Jul. 25, 2019, 11 pages.
U.S. Appl. No. 15/270,868 Non-final Office Action dated Mar. 28, 2019, 10 pages.
U.S. Appl. No. 16/017,339 Final Office Action dated Sep. 11, 2020, 13 pages.
U.S. Appl. No. 16/017,339 Nonfinal Office Action dated Mar. 6, 2020, 9 pages.
U.S. Appl. No. 16/017,339 Nonfinal Office Action dated Mar. 12, 2021, 12 pages.
U.S. Appl. No. 16/409,177 Nonfinal Office Action dated Apr. 13, 2021, 11 pages.
U.S. Appl. No. 16/814,734 Nonfinal Office Action dated Apr. 27, 2021, 18 pages.
U.S. Appl. No. 16/814,734 Final Office Action dated Sep. 25, 2020, 17 pages.
U.S. Appl. No. 16/814,734 Nonfinal Office Action dated Jun. 12, 2020, 16 pages.

* cited by examiner

METHOD OF PRODUCING INTEGRAL 3D HUMIC ACID-CARBON HYBRID FOAM

FIELD OF THE INVENTION

The present invention relates generally to the field of carbon/graphite foams and, more particularly, to a new form of porous carbon material herein referred to as an integral 3D humic acid-carbon hybrid foam and a method of producing same.

BACKGROUND OF THE INVENTION

Carbon is known to have five unique crystalline structures, including diamond, fullerene (0-D nano graphitic material), carbon nano-tube or carbon nano-fiber (1-D nano graphitic material), graphene (2-D nano graphitic material), and graphite (3-D graphitic material).

The carbon nano-tube (CNT) refers to a tubular structure grown with a single wall or multi-wall. Carbon nano-tubes (CNTs) and carbon nano-fibers (CNFs) have a diameter on the order of a few nanometers to a few hundred nanometers. Their longitudinal, hollow structures impart unique mechanical, electrical and chemical properties to the material. The CNT or CNF is a one-dimensional nano carbon or 1-D nano graphite material. However, CNTs are difficult to produce and are extremely expensive. Further, CNTs are known to be difficult to disperse in a solvent or water and difficult to mix with other materials. These characteristics have severely limited their scope of application.

A single-layer graphene sheet is composed of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. NGPs include pristine graphene (essentially 99% of carbon atoms), slightly oxidized graphene (<5% by weight of oxygen), and graphene oxide (≥5% by weight of oxygen).

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was among the first to discover graphene [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were previously reviewed by us [Bor Z. Jang and A Zhamu, "Processing of Nano Graphene Platelets (NGPs) and NGP Nanocomposites: A Review," J. Materials Sci. 43 (2008) 5092-5101]. Four main prior-art approaches have been followed to produce NGPs. Their advantages and shortcomings are briefly summarized as follows:
Approach 1: Chemical Formation and Reduction of Graphene Oxide (GO)

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d = ½ \, d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.
(4) The thermal exfoliation requires a high temperature (typically 800-1,200° C.) and, hence, is a highly energy-intensive process.
(5) Both heat- and solution-induced exfoliation approaches require a very tedious washing and purification step. For instance, typically 2.5 kg of water is used to wash and recover 1 gram of GIC, producing huge quantities of waste water that need to be properly treated.

(6) In both the heat- and solution-induced exfoliation approaches, the resulting products are GO platelets that must undergo a further chemical reduction treatment to reduce the oxygen content. Typically even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

Approach 2: Direct Formation of Pristine Nano Graphene Platelets

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs.

Approach 3: Epitaxial Growth and Chemical Vapor Deposition of Nano Graphene Sheets on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Another process for producing graphene, in a thin film form (typically <2 nm in thickness), is the catalytic chemical vapor deposition process. This catalytic CVD involves catalytic decomposition of hydrocarbon gas (e.g. $C_2H_4$) on Ni or Cu surface to form single-layer or few-layer graphene. With Ni or Cu being the catalyst, carbon atoms obtained via decomposition of hydrocarbon gas molecules at a temperature of 800-1,000° C. are directly deposited onto Cu foil surface or precipitated out to the surface of a Ni foil from a Ni—C solid solution state to form a sheet of single-layer or few-layer graphene (less than 5 layers). The Ni- or Cu-catalyzed CVD process does not lend itself to the deposition of more than 5 graphene planes (typically <2 nm) beyond which the underlying Ni or Cu layer can no longer provide any catalytic effect. The CVD graphene films are extremely expensive.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2, 3,5,6-tetraphenyl-benzene with 4-bromophenylboronic acid. The resulting hexaphenylbenzene derivative was further derivatized and ring-fused into small graphene sheets. This is a slow process that thus far has produced very small graphene sheets.

Hence, an urgent need exists to have a new class of carbon nano materials that are comparable or superior to graphene in terms of properties, but can be produced more cost-effectively, faster, more scalable, and in a more environmentally benign manner. The production process for such a new carbon nano material requires a reduced amount of undesirable chemical (or elimination of these chemicals all together), shortened process time, less energy consumption, reduced or eliminated effluents of undesirable chemical species into the drainage (e.g., sulfuric acid) or into the air (e.g., $SO_2$ and $NO_2$). Furthermore, one should be able to readily make this new nano material into a foam structure that is relatively conductive thermally and electrically.

Generally speaking, a foam or foamed material is composed of pores (or cells) and pore walls (a solid material). The pores can be interconnected to form an open-cell foam. As an example, graphene foam is composed of pores and pore walls that contain a graphene material. There are three major methods of producing graphene foams, which are all tedious, energy-intensive, and slow:

The first method is the hydrothermal reduction of graphene oxide hydrogel that typically involves sealing graphene oxide (GO) aqueous suspension in a high-pressure autoclave and heating the GO suspension under a high pressure (tens or hundreds of atm) at a temperature typically in the range of 180-300° C. for an extended period of time (typically 12-36 hours). A useful reference for this method is given here: Y. Xu, et al. "Self-Assembled Graphene Hydrogel via a One-Step Hydrothermal Process," ACS Nano 2010, 4, 4324-4330. There are several major issues associated with this method: (a) The high pressure requirement makes it an impractical method for industrial-scale production. For one thing, this process cannot be conducted on a continuous basis. (b) It is difficult, if not impossible, to exercise control over the pore size and the porosity level of the resulting porous structure. (c) There is no flexibility in terms of varying the shape and size of the resulting reduced graphene oxide (RGO) material (e.g. it cannot be made into a film shape). (d) The method involves the use of an ultra-low concentration of GO suspended in water (e.g. 2 mg/mL=2 g/L=2 kg/kL). With the removal of non-carbon elements (up to 50%), one can only produce less than 2 kg of graphene material (RGO) per 1000-liter suspension. Furthermore, it is practically impossible to operate a 1000-liter reactor that has to withstand the conditions of a high temperature and a high pressure. Clearly, this is not a scalable process for mass production of porous graphene structures.

The second method is based on a template-assisted catalytic CVD process, which involves CVD deposition of graphene on a sacrificial template (e.g. Ni foam). The graphene material conforms to the shape and dimensions of the Ni foam structure. The Ni foam is then etched away using an etching agent, leaving behind a monolith of graphene skeleton that is essentially an open-cell foam. A useful reference for this method is given here: Zongping Chen, et al., "Three-dimensional flexible and conductive interconnected graphene networks grown by chemical vapour deposition," Nature Materials, 10 (June 2011) 424-428. There are several problems associated with such a process: (a) the catalytic CVD is intrinsically a very slow, highly energy-intensive, and expensive process; (b) the etching agent is typically a highly undesirable chemical and the resulting Ni-containing etching solution is a source of pollution. It is very difficult and expensive to recover or recycle the dissolved Ni metal from the etchant solution. (c) It is challenging to maintain the shape and dimensions of the graphene foam without damaging the cell walls when the Ni foam is being etched away. The resulting graphene foam is typically very brittle and fragile. (d) The transport of the CVD precursor gas (e.g. hydrocarbon) into the interior of a metal foam can be difficult, resulting in a non-uniform structure, since certain spots inside the sacrificial metal foam may not be accessible to the CVD precursor gas.

The third method of producing graphene foam also makes use of a sacrificial material (e.g. colloidal polystyrene particles, PS) that is coated with graphene oxide sheets using a self-assembly approach. For instance, Choi, et al. prepared chemically modified graphene (CMG) paper in two steps: fabrication of free-standing PS/CMG films by vacuum filtration of a mixed aqueous colloidal suspension of CMG and PS (2.0 μm PS spheres), followed by removal of PS beads to generate 3D macro-pores [B. G. Choi, et al., "3D Macroporous Graphene Frameworks for Supercapacitors with High Energy and Power Densities," ACS Nano, 6 (2012) 4020-4028.]. Choi, et al. fabricated well-ordered free-standing PS/CMG paper by filtration, which began with separately preparing a negatively charged CMG colloidal and a positively charged PS suspension. A mixture of CMG colloidal and PS suspension was dispersed in solution under controlled pH (=2), where the two compounds had the same surface charges (zeta potential values of +13±2.4 mV for CMG and +68±5.6 mV for PS). When the pH was raised to 6, CMGs (zeta potential=−29±3.7 mV) and PS spheres (zeta potential=+51±2.5 mV) were assembled due to the electrostatic interactions and hydrophobic characteristics between them, and these were subsequently integrated into PS/CMG composite paper through a filtering process. This method also has several shortcomings: (a) This method requires very tedious chemical treatments of both graphene oxide and PS particles. (b) The removal of PS by toluene also leads to weakened macro-porous structures. (c) Toluene is a highly regulated chemical and must be treated with extreme caution. (d) The pore sizes are typically excessively big (e.g. several μm), too big for many useful applications.

The above discussion clearly indicates that every prior art method or process for producing graphene and graphene foams has major deficiencies. Thus, it is an object of the present invention to provide a new class of foam material that is thermally and electrically conducting and mechanically robust and to provide a cost-effective method of producing this class of foam.

Humic acid (HA) is an organic matter commonly found in soil and can be extracted from the soil using a base (e.g. KOH). HA can also be extracted, with a high yield, from a type of coal called leonardite, which is a highly oxidized version of lignite coal. HA extracted from leonardite contains a number of oxygenated groups (e.g. carboxyl groups) located around the edges of the graphene-like molecular center ($SP^2$ core of hexagonal carbon structure). This material is slightly similar to graphene oxide (GO) which is produced by strong acid oxidation of natural graphite. HA has a typical oxygen content of 5% to 42% by weight (other major elements being carbon and hydrogen). HA, after chemical or thermal reduction, has an oxygen content of 0.01% to 5% by weight. For claim definition purposes in the instant application, humic acid (HA) refers to the entire oxygen content range, from 0.01% to 42% by weight. The reduced humic acid (RHA) is a special type of HA that has an oxygen content of 0.01% to 5% by weight.

The present invention is directed at a new class of graphene-like 2D materials (i.e. humic acid) that surprisingly can be used in a combination with carbon to form a hybrid foam. Thus, another object is to provide a cost-effective method of producing such a nano carbon foam (specifically, integral 3D humic acid-carbon hybrid foam) in large quantities. This method or process does not involve the use of an environmentally unfriendly chemical. This method enables the flexible design and control of the porosity level and pore sizes.

It is another object of the present invention to provide a humic acid-derived hybrid foam that exhibits a thermal conductivity, electrical conductivity, elastic modulus, and/or strength comparable to or greater than those of the conventional graphite foams, carbon foams, or graphene foams.

Yet another object of the present invention is to provide (a) a reduced humic acid-based hybrid foam that contains essentially all carbon only (<5% by weight of non-carbon content, preferably <1%, and further preferably <0.1%) and preferably have a meso-scaled pore size range (2-50 nm); and (b) humic acid foams that contain at least 5% by weight (typically from 5% to 42% by weight and most typically from 5% to 20%) of non-carbon elements that can be used for a broad array of applications.

Another object of the present invention is to provide products (e.g. devices) that contain an integral 3D humic acid-carbon foam of the present invention and methods of operating these products.

SUMMARY OF THE INVENTION

The present invention provides a method of producing an integral 3D humic acid-carbon hybrid foam. This method is stunningly simple. The method comprises: (A) forming a solid shape of humic acid-polymer particle mixture; and (B) pyrolyzing the solid shape of humic acid-polymer particle mixture to thermally reduce said humic acid into reduced humic acid sheets and, essentially concurrently, thermally convert the polymer into pores and carbon or graphite that bonds reduced humic acid sheets to form the integral 3D humic acid-carbon hybrid foam.

Preferably, step (A) comprises: (i) dispersing humic acid in water or a solvent to form a suspension and dispersing multiple polymer particles in this suspension to form a slurry; and (ii) dispensing the slurry and removing water or solvent to form a solid shape of humic acid-polymer particle mixture. Such a step enables humic acid molecules or sheets to wrap around polymer particles (fully coated and embraced by humic acid).

Preferably, the integral 3D humic acid-carbon hybrid foam is in a film, sheet, paper, filament, rod, powder, ingot, or bulk form of essentially any reasonable shape.

The polymer particles preferably include plastic or rubber beads, pellets, spheres, wires, fibers, filaments, discs, ribbons, or rods, having a diameter or thickness from 10 nm to 10 mm (preferably from 100 nm to 1 mm). In some embodiments, the polymer particles are selected from solid particles of a thermoplastic, thermoset resin, rubber, semi-penetrating network polymer, penetrating network polymer, natural polymer, or a combination thereof.

In certain embodiments, the polymer particles contain a high carbon-yield polymer selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

In other embodiments, the polymer particles contain a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof.

In the invented method, the step of pyrolyzing can include carbonizing the polymer particles at a temperature from 200° C. to 2,500° C. to obtain reduced humic acid-carbon foam, or carbonizing the polymer particles at a temperature from 200° C. to 2,500° C. to obtain reduced humic acid-carbon foam and then graphitizing the reduced humic acid-carbon foam from 2,500° C. to 3,200° C. to obtain graphitized humic acid-carbon foam.

In certain embodiments, the shaping step includes melting the polymer particles to form a polymer melt mixture with humic acid sheets dispersed therein, forming the polymer melt mixture into a desired shape and solidifying the desired shape into a humic acid-polymer composite structure.

In certain embodiments, the shaping step includes dissolving the polymer particles in a solvent to form a polymer solution mixture with humic acid sheets dispersed therein, forming the polymer solution mixture into a desired shape, and removing the solvent to solidify the desired shape into a humic acid-polymer composite structure.

In desired embodiments where humic acid molecules or sheets wrap around (fully coat and embrace) the polymer particles, the shaping step includes forming the humic acid-coated polymer particles into a composite shape selected from a rod, sheet, film, fiber, powder, ingot, or block form. Alternatively, the shaping step includes compacting humic acid-coated polymer particles into a porous green compact having macroscopic pores and then infiltrating or impregnating the pores with an additional carbon source material selected from a petroleum pitch, coal tar pitch, an aromatic organic material, a monomer, an organic polymer, or a combination thereof. The organic polymer may contain a high carbon-yield polymer selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof.

In desired embodiments where humic acid molecules or sheets wrap around (fully coat and embrace) the polymer particles, the shaping step includes forming a mass of said graphene-coated or graphene-embedded polymer particles into a compacted object. The compacted object may be in a form selected from a rod, sheet, film, fiber, powder, ingot, or block.

DESCRIPTION OF THE PREFERRED EMBODIMENTS

Humic acid (HA) is an organic matter commonly found in soil and can be extracted from the soil using a base (e.g. KOH). HA can also be extracted from a type of coal called leonardite, which is a highly oxidized version of lignite coal. HA extracted from leonardite contains a number of oxygenated groups (e.g. carboxyl groups) located around the edges of the graphene-like molecular center ($SP^2$ core of hexagonal carbon structure). This material is slightly similar to graphene oxide (GO) which is produced by strong acid oxidation of natural graphite. HA has a typical oxygen content of 5% to 42% by weight (other major elements being carbon, hydrogen, and nitrogen). Example of a typical humic acid, having a variety of components including quinone, phenol, catechol and sugar moieties, is given in Scheme 1 below (source: Stevenson F. J. "*Humus Chemistry: Genesis, Composition, Reactions,*" John Wiley & Sons, New York 1994).

(Scheme 1)

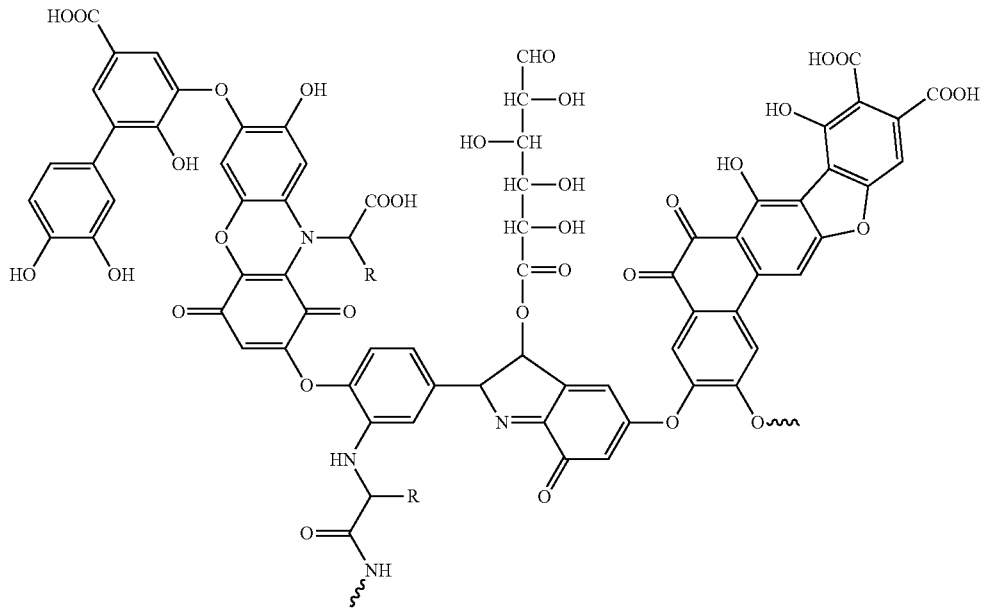

Figure 1:
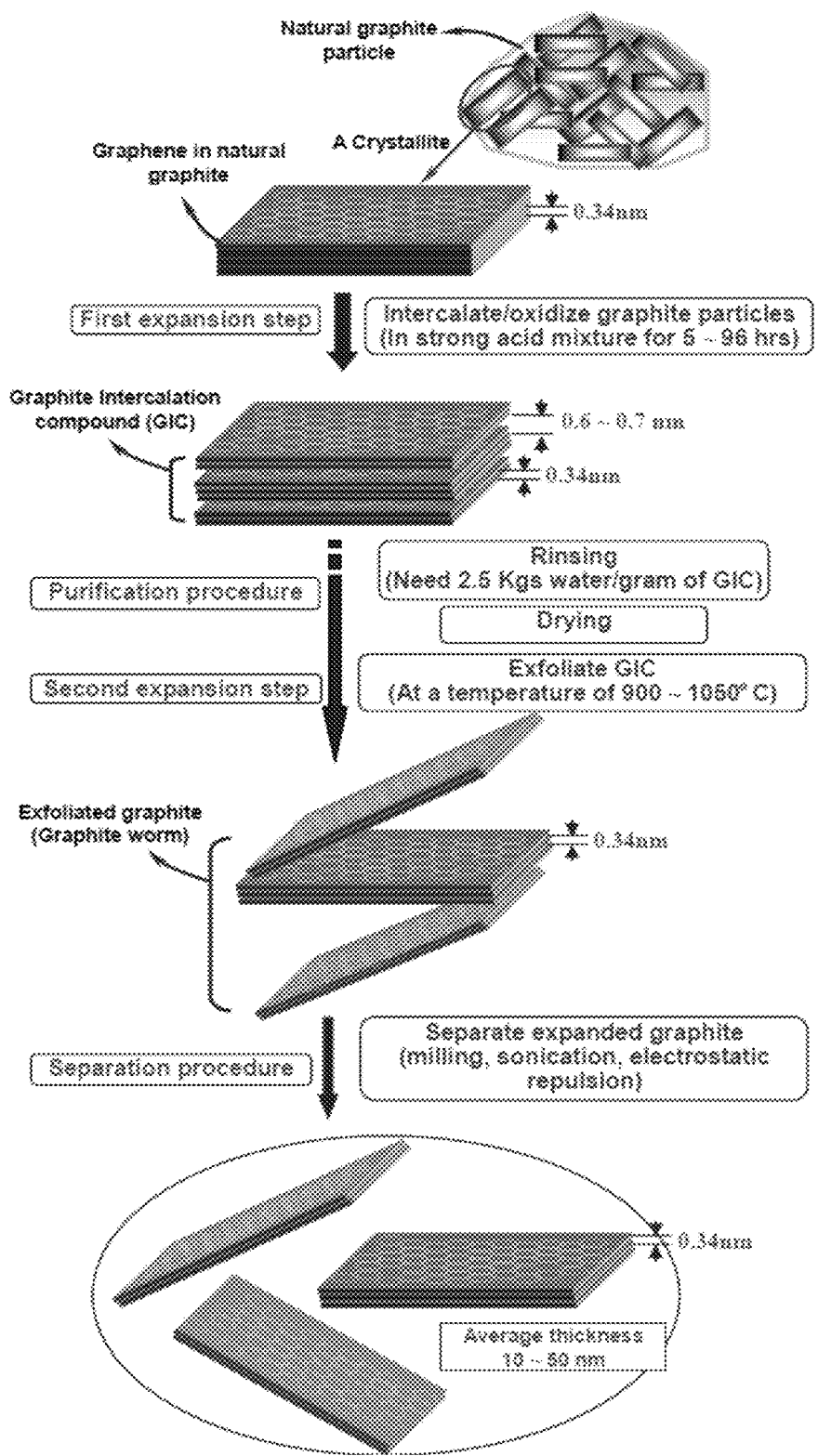
FIG. 1 A flow chart showing the most commonly used prior art process of producing highly oxidized graphene (NGPs) that entails tedious chemical oxidation/intercalation, rinsing, and high-temperature exfoliation procedures.
Figure 2:
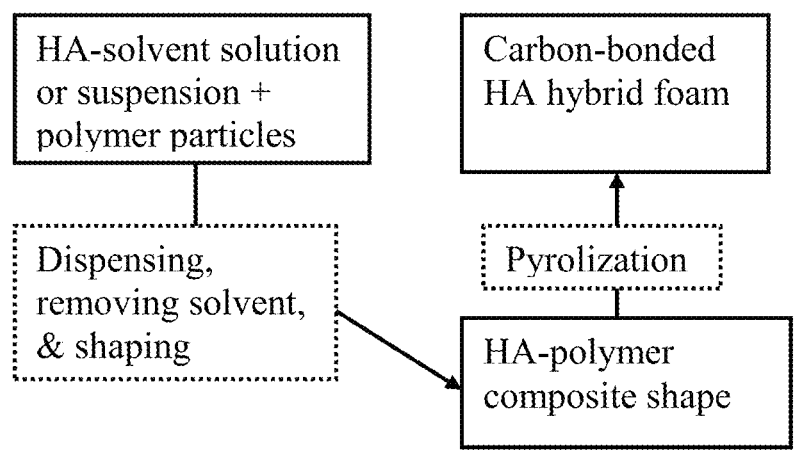
FIG. 2 A flow chart showing the presently invented process for producing integral 3D humic acid-carbon hybrid foam.

The present invention provides an integral 3D humic acid-carbon hybrid foam and a method of producing such a hybrid foam. This method is stunningly simple, but effective, of low cost, and environmentally benign. As schematically illustrated in FIG. 2, the method comprises: (A) forming a solid shape of humic acid-polymer particle mixture; and (B) pyrolyzing the solid shape of humic acid-polymer particle mixture to thermally reduce humic acid into reduced humic acid sheets and, essentially concurrently, thermally convert the polymer into pores and carbon or graphite that bonds reduced humic acid sheets to form the integral 3D humic acid-carbon hybrid foam.

Preferably, step (A) comprises: (i) dispersing humic acid in water or a solvent to form a suspension (or solution) and dispersing multiple polymer particles in this suspension or solution to form a slurry; and (ii) dispensing the slurry and removing water or solvent to form a solid shape of humic acid-polymer particle mixture. Such a step enables humic acid molecules or sheets to wrap around polymer particles (polymer particles being fully coated and embraced by humic acid). Humic acid (HA) is readily dissolved in water and a wide variety of polar solvents, such as methanol and ethanol.

Preferably, upon heat treatments, the solid shape is transformed into an integral 3D humic acid-carbon hybrid foam, which can be in a film, sheet, paper, filament, rod, powder, ingot, or bulk form of essentially any desired shape.

The method can include forming humic acid-embraced particles into a desired shape of humic acid-polymer composite structure. This forming step can be as simple as a compacting step that just mechanically packs humic acid-coated or embedded polymer particles into a desired shape. Alternatively, this forming step can entail melting the polymer particles to form a polymer matrix with humic acid molecules or sheets dispersed therein. Such a humic acid-polymer structure can be in any practical shape or dimensions (fiber, rod, plate, cylinder, or any regular shape or odd shape).

The humic acid-polymer compact or composite structure is then pyrolyzed to thermally reduce humic acid into reduced humic acid (RHA) and, concurrently, thermally convert the polymer into carbon or graphite that bonds the reduced humic acid sheets together to form the integral 3D RHA-carbon hybrid foam. The non-carbon content of RHA can be varied between approximately 0.01% by weight and 5% by weight, depending upon the maximum heat treatment temperature involved.

For the formation of the carbon component of the resulting humic acid-carbon hybrid foam, one can choose polymer particles that have a high carbon yield or char yield (e.g. >30% by weight of a polymer being converted to a solid carbon phase; instead of becoming part of a volatile gas). The high carbon-yield polymer may be selected from phenolic resin, poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof. When pyrolyzed, particles of these polymers become porous, as illustrated in the bottom portion of FIG. 3.

If a lower carbon content (higher humic acid proportion relative to carbon proportion) and lower foam density (higher porosity level) are desired in the HC-carbon hybrid foam, the polymer can contain a low carbon-yield polymer selected from polyethylene, polypropylene, polybutylene, polyvinyl chloride, polycarbonate, acrylonitrile-butadiene (ABS), polyester, polyvinyl alcohol, poly vinylidiene fluoride (PVDF), polytetrafluoroethylene (PTFE), polyphenylene oxide (PPO), poly methyl methacrylate (PMMA), a copolymer thereof, a polymer blend thereof, or a combination thereof. When pyrolyzed, particles of these polymers become porous, as illustrated in the middle portion of FIG. 3.

These polymers (both high and low carbon yields), when heated at a temperature of 300-2,500° C., are converted into a carbon material, which is preferentially nucleated near humic acid (HA) sheet edges. Such a carbon material naturally bridges the gaps between HA sheets, forming interconnected electron-conducting pathways. In actuality, the resulting HA-carbon hybrid foam is composed of integral 3D network of carbon-bonded HA sheets, enabling continuous transport of electrons and phonons (quantized lattice vibrations) between HA sheets or domains without interruptions. When further heated at a temperature higher than 2,500° C., the carbon phase can get graphitized to further increase both the electric conductivity and thermal conductivity. The amount of non-carbon elements is also decreased to typically below 1% by weight (down to 0.01%) if the graphitization time exceeds 1 hour.

It may be noted that an organic polymer typically contains a significant amount of non-carbon elements, which can be reduced or eliminated via heat treatments. As such, pyrolyzation of a polymer causes the formation and evolution of volatile gas molecules, such as $CO_2$ and $H_2O$, which lead to the formation of pores in the resulting polymeric carbon phase. However, such pores also have a high tendency to get collapsed if the polymer is not constrained when being carbonized (the carbon structure can shrink while non-carbon elements are being released). We have surprising discovered that the humic acid sheets wrapped around a polymer particle are capable of constraining the carbon pore walls from being collapsed. In the meantime, some carbon species also permeate to the gaps between humic acid sheets where these species bond the humic acid sheets together. The pore sizes and pore volume (porosity level) of the resulting 3D integral humic acid-carbon foam mainly depend upon the starting polymer size and the carbon yield of the polymer.

It may be further noted that a certain desired degree of hydrophilicity can be imparted to the pore walls of the humic acid-carbon hybrid foam if the non-carbon element content (H and O) is from 2 to 20% by weight. These features enable separation of oil from water by selectively absorbing oil from an oil-water mixture. In other words, such a HA-carbon hybrid foam material is capable of recovering oil from water, helping to clean up oil-spilled river, lake, or ocean. The oil absorption capacity is typically from 50% to 500% of the foam's own weight. This is a wonderfully useful material for environmental protection purposes.

If a high electrical or thermal conductivity is desired, the HA-carbon foam can be subjected to graphitization treatment at a temperature higher than 2,500° C. The resulting material is particularly useful for thermal management applications (e.g. for use to make a finned heat sink, a heat exchanger, or a heat spreader).

It may be noted that the HA-carbon foam may be subjected to compression during and/or after the graphitization treatment. This operation enables us to adjust the graphene sheet orientation and the degree of porosity.

In order to characterize the structure of the graphitic materials produced, X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. In the present study, the graphene-like (HA or RHA) foam walls having a $d_{002}$ higher than 0.3440 nm reflects the presence of oxygen-containing functional groups (such as —OH, >O, and —COOH on graphene molecular plane surfaces or edges) that act as a spacer to increase the inter-graphene spacing.

Another structural index that can be used to characterize the degree of ordering of the stacked and bonded RHA planes in the foam walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our RHA walls have a mosaic spread value in this range of 0.2-0.4 (if produced with a heat treatment temperature (HTT) no less than 2,500° C.). However, some values are in the range of 0.4-0.7 if the HTT is between 1,500 and 2,500° C., and in the range of 0.7-1.0 if the HTT is between 300 and 1,500° C.

In-depth studies using a combination of SEM, TEM, selected area diffraction, X-ray diffraction, AFM, Raman spectroscopy, and FTIR indicate that the humic acid-carbon foam walls are composed of several large graphene planes (with length/width typically >>20 nm, more typically >>100 nm, often >>1 μm, and, in many cases, >>10 μm). This is quite unexpected since the lateral dimensions (length and width) of original humic acid sheets or molecules, prior to being heat treated, are typically <20 nm and more typically <10 nm. This implies that a plurality of HA sheets or molecules can be merged edge to edge through covalent bonds with one another, into a larger (longer or wider) sheet.

These large graphene-like planes also can be stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

The integral 3D HA-carbon hybrid foam is composed of multiple pores and pore walls, wherein the pore walls contain single-layer or few-layer HA sheets chemically bonded by a carbon material having a carbon material-to-HA weight ratio from 1/100 to 1/2, wherein the few-layer HA sheets have 2-10 layers of stacked graphene-like HA planes having an inter-plane spacing $d_{002}$ from 0.3354 nm to 0.36 nm as measured by X-ray diffraction and the single-layer or few-layer graphene-like HA sheets contain 0.01% to 25% by weight of non-carbon elements (more typically <15%). A plurality of single-layer or few-layer HA sheets embracing the underlying polymer particles can overlap with one another to form a stack of graphene-like sheets. The stack can have a thickness greater than 5 nm and, in some cases, greater than 10 nm.

The integral 3D HA-carbon hybrid foam typically has a density from 0.001 to 1.7 g/cm³, a specific surface area from 50 to 3,000 m²/g, a thermal conductivity of at least 200 W/mK per unit of specific gravity, and/or an electrical conductivity no less than 2,000 S/cm per unit of specific gravity. In a preferred embodiment, the pore walls contain stacked graphene-like RHA planes having an inter-planar spacing $d_{002}$ from 0.3354 nm to 0.40 nm as measured by X-ray diffraction.

Many of the HA sheets can be merged edge to edge through covalent bonds with one another, into an integrated RHA entity. The gaps between the free ends of those unmerged sheets or shorter merged sheets are bonded by the carbon phase converted from the polymer particles. Due to these unique chemical composition (including oxygen or hydrogen content, etc.), morphology, crystal structure (including inter-planar spacing), and structural features (e.g. degree of orientations, few defects, chemical bonding and no gap between graphene-like sheets, and substantially no interruptions along graphene plane directions), the HA-carbon hybrid foam has a unique combination of outstanding thermal conductivity, electrical conductivity, mechanical strength, and stiffness (elastic modulus).

Thermal Management Applications

The aforementioned features and characteristics make the integral 3D HA-carbon hybrid foam an ideal element for a broad array of engineering and biomedical applications. For instance, for thermal management purposes alone, the graphene-carbon foam can be used in the following applications:
  a) The HA-carbon hybrid foam, being compressible and of high thermal conductivity, is ideally suited for use as a thermal interface material (TIM) that can be implemented between a heat source and a heat spreader or between a heat source and a heat sink.
  b) The hybrid foam can be used as a heat spreader per se due to its high thermal conductivity.
  c) The hybrid foam can be used as a heat sink or heat dissipating material due to his high heat-spreading capability (high thermal conductivity) and high heat-dissipating capability (large number of surface pores inducing massive air-convection micro or nano channels).
  d) The light weight (low density adjustable between 0.001 and 1.8 g/cm$^3$), high thermal conductivity per unit specific gravity or per unit of physical density, and high structural integrity (HA sheets being bonded by carbon) make this hybrid foam an ideal material for a durable heat exchanger.

The HA-carbon hybrid foam-based thermal management or heat dissipating devices include a heat exchanger, a heat sink (e.g. finned heat sink), a heat pipe, high-conductivity insert, thin or thick conductive plate (between a heat sink and a heat source), thermal interface medium (or thermal interface material, TIM), thermoelectric or Peltier cooling plate, etc.

A heat exchanger is a device used to transfer heat between one or more fluids; e.g. a gas and a liquid separately flowing in different channels. The fluids are typically separated by a solid wall to prevent mixing. The presently invented graphene-carbon hybrid foam material is an ideal material for such a wall provided the foam is not a totally open-cell foam that allows for mixing of fluids. The presently invented method enables production of both open-cell and closed-cell foam structures. The high surface pore areas enable dramatically faster exchange of heats between the two or multiple fluids.

Heat exchangers are widely used in refrigeration systems, air conditioning units, heaters, power stations, chemical plants, petrochemical plants, petroleum refineries, natural-gas processing, and sewage treatment. A well-known example of a heat exchanger is found in an internal combustion engine in which a circulating engine coolant flows through radiator coils while air flows past the coils, which cools the coolant and heats the incoming air. The solid walls (e.g. that constitute the radiator coils) are normally made of a high thermal conductivity material, such as Cu and Al. The presently invented HA-carbon foam having either a higher thermal conductivity or higher specific surface area is a superior alternative to Cu and Al, for instance.

There are many types of heat exchangers that are commercially available: shell and tube heat exchanger, plate heat exchangers, plate and shell heat exchanger, adiabatic wheel heat exchanger, plate fin heat exchanger, pillow plate heat exchanger, fluid heat exchangers, waste heat recovery units, dynamic scraped surface heat exchanger, phase-change heat exchangers, direct contact heat exchangers, and microchannel heat exchangers. Every one of these types of heat exchangers can take advantage of the exceptional high thermal conductivity and specific surface area of the presently invented foam material.

The presently invented solid HA-carbon foam can also be used in a heat sink. Heat sinks are widely used in electronic devices for heat dissipation purposes. The central processing unit (CPU) and battery in a portable microelectronic device (such as a notebook computer, tablet, and smart phone) are well-known heat sources. Typically, a metal or graphite object (e.g. Cu foil or graphite foil) is brought into contact with the hot surface and this object helps to spread the heat to an external surface or outside air (primarily by conduction and convection and to a lesser extent by radiation). In most cases, a thin thermal interface material (TIM) mediates between the hot surface of the heat source and a heat spreader or a heat-spreading surface of a heat sink. (The presently invented HA-carbon foam can also be used as a TIM.)

A heat sink usually consists of a high-conductivity material structure with one or more flat surfaces to ensure good thermal contact with the components to be cooled, and an array of comb or fin like protrusions to increase the surface contact with the air, and thus the rate of heat dissipation. A heat sink may be used in conjunction with a fan to increase the rate of airflow over the heat sink. A heat sink can have multiple fins (extended or protruded surfaces) to improve heat transfer. In electronic devices with limited amount of space, the shape/arrangement of fins must be optimized such that the heat transfer density is maximized. Alternatively or additionally, cavities (inverted fins) may be embedded in the regions formed between adjacent fins. These cavities are effective in extracting heat from a variety of heat generating bodies to a heat sink.

Typically, an integrated heat sink comprises a heat collection member (core or base) and at least one heat dissipation member (e.g. a fin or multiple fins) integral to the heat collection member (base) to form a finned heat sink. The fins and the core are naturally connected or integrated together into a unified body without using an externally applied adhesive or mechanical fastening means to connect the fins to the core. The heat collection base has a surface in thermal contact with a heat source (e.g. a LED), collects heat from this heat source, and dissipates heat through the fins into the air.

Figure 10:
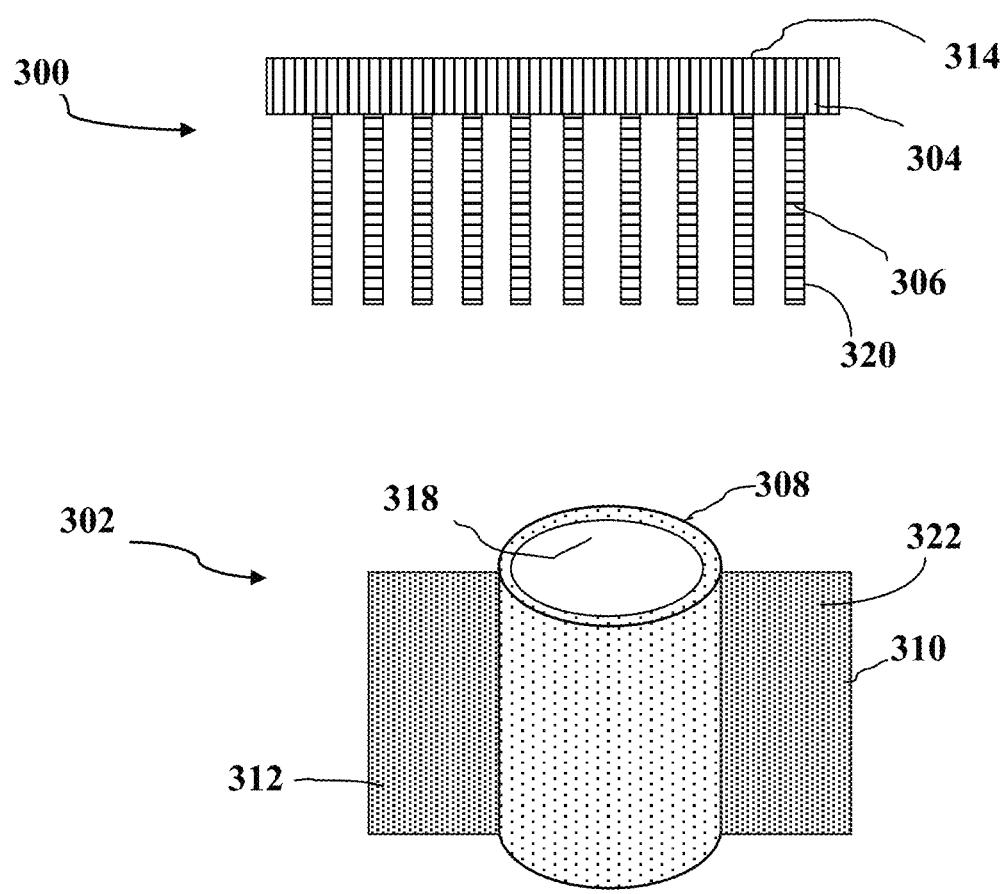
FIG. 10 Schematic of heat sink structures (2 examples).

As illustrative examples, FIG. 10 provides a schematic of two heat sinks: 300 and 302. The first one contains a heat collection member (or base member) 304 and multiple fins or heat dissipation members (e.g. fin 306) connected to the base member 304. The base member 304 is shown to have a heat collection surface 314 intended to be in thermal contact with a heat source. The heat dissipation member or fin 306 is shown to have at least a heat dissipation surface 320.

A particularly useful embodiment is an integrated radial heat sink 302 comprising a radial finned heat sink assembly that comprises: (a) a base 308 comprising a heat collection surface 318; and (b) a plurality of spaced parallel planar fin members (e.g. 310, 312 as two examples) supported by or integral with the base 308, wherein the planar fin members (e.g. 310) comprise the at least one heat dissipation surface 322. Multiple parallel planar fin members are preferably equally spaced.

The presently invented HA-carbon hybrid foam, being highly elastic and resilient, is itself a good thermal interface material and a highly effective heat spreading element as well. In addition, this high-conductivity foam can also be used as an inserts for electronic cooling and for enhancing the heat removal from small chips to a heat sink. Because the space occupied by high conductivity materials is a major concern, it is a more efficient design to make use of high conductivity pathways that can be embedded into a heat generating body. The elastic and highly conducting solid graphene foam herein disclosed meets these requirements perfectly.

The high elasticity and high thermal conductivity make the presently invented solid HA-carbon hybrid foam a good conductive thick plate to be placed as a heat transfer interface between a heat source and a cold flowing fluid (or any other heat sink) to improve the cooling performance. In such arrangement, the heat source is cooled under the thick HA-carbon foam plate instead of being cooled in direct contact with the cooling fluid. The thick plate of HA-carbon foam can significantly improve the heat transfer between the heat source and the cooling fluid by way of conducting the heat current in an optimal manner. No additional pumping power and no extra heat transfer surface area are required.

The solid HA-carbon foam is also an outstanding material to construct a heat pipe. A heat pipe is a heat transfer device that uses evaporation and condensation of a two-phase working fluid or coolant to transport large quantities of heat with a very small difference in temperature between the hot and cold interfaces. A conventional heat pipe consists of sealed hollow tube made of a thermally conductive metal such as Cu or Al, and a wick to return the working fluid from the evaporator to the condenser. The pipe contains both saturated liquid and vapor of a working fluid (such as water, methanol or ammonia), all other gases being excluded. However, both Cu and Al are prone to oxidation or corrosion and, hence, their performance degrades relatively fast over time. In contrast, the solid HA-carbon foam is chemically inert and does not have these oxidation or corrosion issues. The heat pipe for electronics thermal management can have a solid graphene foam envelope and wick, with water as the working fluid. HA-carbon/methanol may be used if the heat pipe needs to operate below the freezing point of water, and HA-carbon/ammonia heat pipes may be used for electronics cooling in space.

Peltier cooling plates operate on the Peltier effect to create a heat flux between the junction of two different conductors of electricity by applying an electric current. This effect is commonly used for cooling electronic components and small instruments. In practice, many such junctions may be arranged in series to increase the effect to the amount of heating or cooling required. The solid graphene foam may be used to improve the heat transfer efficiency.

Filtration and Fluid Absorption Applications

The solid HA-carbon foam can be made to contain microscopic pores (<2 nm) or meso-scaled pores having a pore size from 2 nm to 50 nm. The solid HA-carbon hybrid foam can also be made to contain micron-scaled pores (1-500 µm). Based on well-controlled pore size alone, the instant HA-carbon foam can be an exceptional filter material for air or water filtration.

Further, the humic acid (HA) pore wall chemistry and carbon phase chemistry can be independently controlled to impart different amounts and/or types of functional groups to either or both of the HA sheets and the carbon binder phase (e.g. as reflected by the percentage of O, F, N, H, etc. in the foam). In other words, the concurrent or independent control of both pore sizes and chemical functional groups at different sites of the internal structure provide unprecedented flexibility or highest degree of freedom in designing and making HA-carbon hybrid foams that exhibit many unexpected properties, synergistic effects, and some unique combination of properties that are normally considered mutually exclusive (e.g. some part of the structure is hydrophobic and other part hydrophilic; or the foam structure is both hydrophobic and oleophilic). A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water. The present method allows for precise control over hydrophobicity, hydrophilicity, and oleophilicity.

The present invention also provides an oil-removing, oil-separating, or oil-recovering device, which contains the presently invented 3D HA-carbon hybrid foam as an oil-absorbing or oil-separating element. Also provided is a solvent-removing or solvent-separating device containing the 3D HA-carbon hybrid foam as a solvent-absorbing element.

A major advantage of using the instant HA-carbon hybrid foam as an oil-absorbing element is its structural integrity. Due to the notion that HA sheets are chemically bonded by the carbon material, the resulting foam would not get disintegrated upon repeated oil absorption operations. In contrast, we have discovered that graphene-based oil-absorbing elements prepared by hydrothermal reduction, vacuum-assisted filtration, or freeze-drying get disintegrated after absorbing oil for 2 or 3 times. There is just nothing (other than weak van der Waals forces existing prior to first contact with oil) to hold these otherwise separated graphene sheets together. Once these graphene sheets are wetted by oil, they no longer are able to return to the original shape of the oil-absorbing element.

Another major advantage of the instant technology is the flexibility in designing and making oil-absorbing elements that are capable of absorbing oil up to an amount as high as 400 times of its own weight yet still maintaining its structural shape (without significant expansion). This amount depends upon the specific pore volume of the foam, which can be controlled mainly by the ratio between the amount of original carrier polymer particles and the amount of HA molecules or sheets prior to the heat treatment.

The invention also provides a method to separate/recover oil from an oil-water mixture (e.g. oil-spilled water or waste water from oil sand). The method comprises the steps of (a) providing an oil-absorbing element comprising an integral HA-carbon hybrid foam; (b) contacting an oil-water mixture with the element, which absorbs the oil from the mixture; and (c) retreating the oil-absorbing element from the mixture and extracting the oil from the element. Preferably, the method comprises a further step of (d) reusing the element.

Additionally, the invention provides a method to separate an organic solvent from a solvent-water mixture or from a multiple-solvent mixture. The method comprises the steps of (a) providing an organic solvent-absorbing element comprising an integral HA-carbon hybrid foam; (b) bringing the element in contact with an organic solvent-water mixture or a multiple-solvent mixture containing a first solvent and at least a second solvent; (c) allowing this element to absorb the organic solvent from the mixture or absorb the first solvent from the at least second solvent; and (d) retreating the element from the mixture and extracting the organic solvent or first solvent from the element. Preferably, the method contains an additional step (e) of reusing the solvent-absorbing element.

The following examples are used to illustrate some specific details about the best modes of practicing the instant invention and should not be construed as limiting the scope of the invention.

Example 1: Production of Humic Acid-Carbon Foam from HA-Coated Polypropylene (PP) Particles One experiment entails dispersing 5% by weight of PP powder in a humic acid-water solution (5% HA) to obtain a slurry. The slurry was then spray-dried to form powder of HA-coated PP particles. The HA-coated PP particles were then compacted in a mold cavity to form a green compact, which was then heat-treated in a sealed crucible at 350° C. and then at 600° C. for 2 hours to produce an integral HA-carbon hybrid foam.

Although polypropylene (PP) is herein used as an example, the solid polymer particles for HA-carbon hybrid foam production are not limited to PP. It could be any polymer (thermoplastic, thermoset, rubber, wax, mastic, gum, organic resin, etc.) provided the polymer can be made into a particulate form (fine powder particles having a diameter preferably in the range of 10 nm-10 μm, further preferably 20 nm-1 μm). It may be noted that un-cured or partially cured thermosetting resins (such as epoxide and imide-based oligomers or rubber) can be made into a particle form at room temperature or lower (e.g. cryogenic temperature). Hence, even partially cured thermosetting resin particles can be used as solid polymer particles.

Example 2: Humic Acid-Carbon Hybrid Foam Using ABS as the Solid Polymer Particles In an experiment, 100 grams of ABS powder, as solid polymer particles, were mixed into a humic acid-ethanol solution to form a slurry. The slurry was cast on a glass surface to form HA-polymer films (20-200 μm thick), which were then carbonized to prepare HA-carbon foam samples under different temperature and compression conditions.

Example 3: Production of Humic Acid-Carbon Hybrid Foam from HA-Coated Polyacrylonitrile (PAN) Fibers (as Solid Polymer Particles)

In one example, PAN fiber segments (2 mm long as the polymer particles) were dispersed in a HA-methanol solution to form a slurry, which was oven dried to form a mass of HA-coated PAN fiber powder. The HA-coated PAN fibers were then compacted and melted together to form several composite films. The films were subjected to heat treatments at 250° C. for 1 hour (in room air), 350° C. for 2 hours, and 1,000° C. for 2 hours (under an argon gas atmosphere) to obtain RHA-carbon foam layers. Half of the carbonized foam layers were then heated to 2,850° C. and maintained at this temperature for 0.5 hours to obtain graphitized RHA-carbon foam.

Example 4: Particles of Cured Phenolic Resin as the Polymer Particles

Particles of cured phenolic resin were dispersed in a HA-water suspension to form a slurry, which was spray-dried to form a slurry. A mass of HA-coated resin particles was compressed to form a green compact, which was then infiltrated with a small amount of petroleum pitch. Separately, another green compact of HA-coated resin particles was prepared under comparable conditions, but no pitch infiltration was attempted. The two compacts were then subjected to identical pyrolysis treatments.

Figure 3:
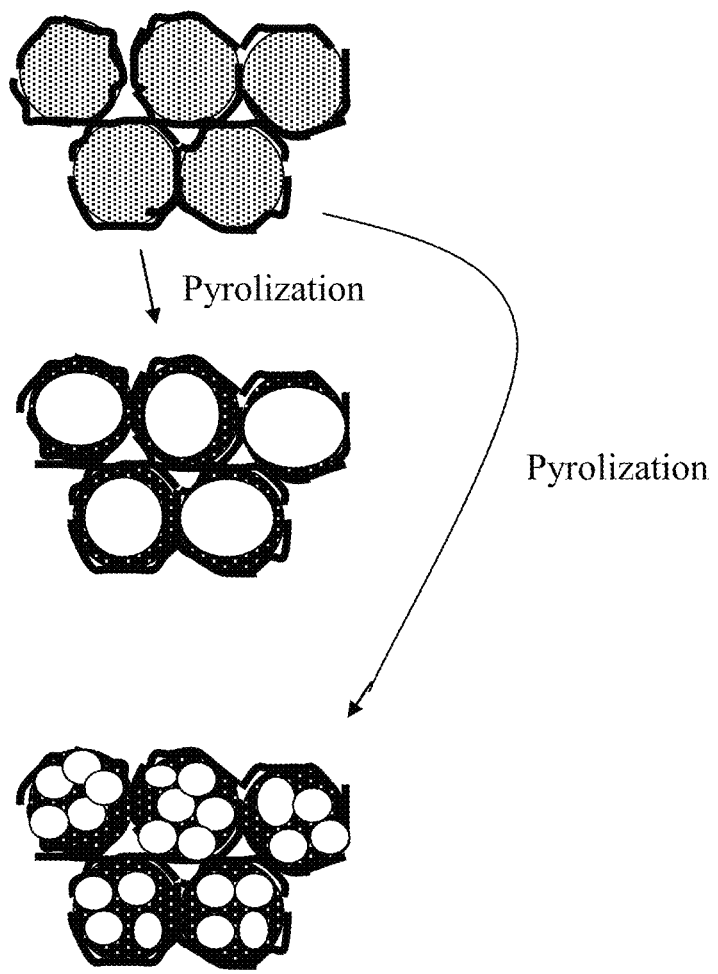
FIG. 3 Schematic of the heat-induced conversion of polymer into carbon, which bonds humic acid sheets together to form a 3D HA-carbon hybrid foam. The compacted structure of humic acid-coated polymer particles is converted into a highly porous structure.

Example 5: Polyethylene (PE) and Nylon 6/6 Beads as the Solid Polymer Particles Slurry coating and drying was used to prepare HA-coated polymer particles. Subsequently, a mass of HA-coated PE pellets and a mass of HA-coated nylon beads were separately compacted in a mold cavity and briefly heated above the melting point of PE or nylon and then rapidly cooled to form two green compacts. For comparison purposes, two corresponding compacts were prepared from a mass of un-coated PE pellets and a mass of un-coated nylon beads. These 4 compacts were then subjected to pyrolyzation (by heating the compacts in a chamber from 100° C. to 650° C.). The results were very surprising. The compacts of HA-coated polymer particles were found to be converted to graphene-carbon hybrid foam structures having dimensions comparable to the dimensions of the original compacts (3 cm×3 cm×0.5 cm). SEM examination of these structures indicates that carbon phases are present near the edges of HA sheets and these carbon phases act to bond the HA sheets together. The carbon-bonded HA sheets form a skeleton of HA-carbon hybrid pore walls having pores being present in what used to be the space occupied by the original polymer particles, as schematically illustrated in FIG. 3.

In contrast, the two compacts from un-coated pellets or beads shrank to become essentially two solid masses of carbon having a volume approximately 15%-20% of the original compact volumes. These highly shrunk solid masses are practically pore-free carbon materials; they are not a foam material.

Examples 6: Micron-Sized Rubber Particles as the Solid Polymer Particles

The experiment began with preparation of micron-sized rubber particles. A mixture of methylhydro dimethyl-siloxane polymer (20 g) and polydimethylsiloxane, vinyldimethyl terminated polymer (30 g) was obtained by using a homogenizer under ambient conditions for 1 minute. Tween 80 (4.6 g) was added and the mixture was homogenized for 20 seconds. Platinum-divinyltetramethyldisiloxane complex (0.5 g in 15 g methanol) was added and mixed for 10 seconds. This mixture was added to 350 g of distilled water and a stable latex was obtained by homogenization for 15 minutes. The latex was heated to 60° C. for 15 hours. The latex was then de-emulsified with anhydrous sodium sulfate (20 g) and the silicone rubber particles were obtained by filtration under a vacuum, washing with distilled water, and drying under vacuum at 25° C. The particle size distribution of the resulting rubber particles was 3-11 μm.

Humic acid-coated rubber particles were obtained by spray-drying of HA-water-rubber slurry. The HA-coated rubber particles were then mixed with 5% by wt. of petroleum pitch (as a binder) and mechanically compacted together to form several composite sheets. The composite sheets were then subjected to heat treatments at 350° C. for 1 hour, 650° C. for 2 hours, and 1,000° C. for 1 hour in a tube furnace to obtain HA-carbon foam layers.

Examples 7: Preparation of Fluorinated HA-Carbon Foams

Figure 9:
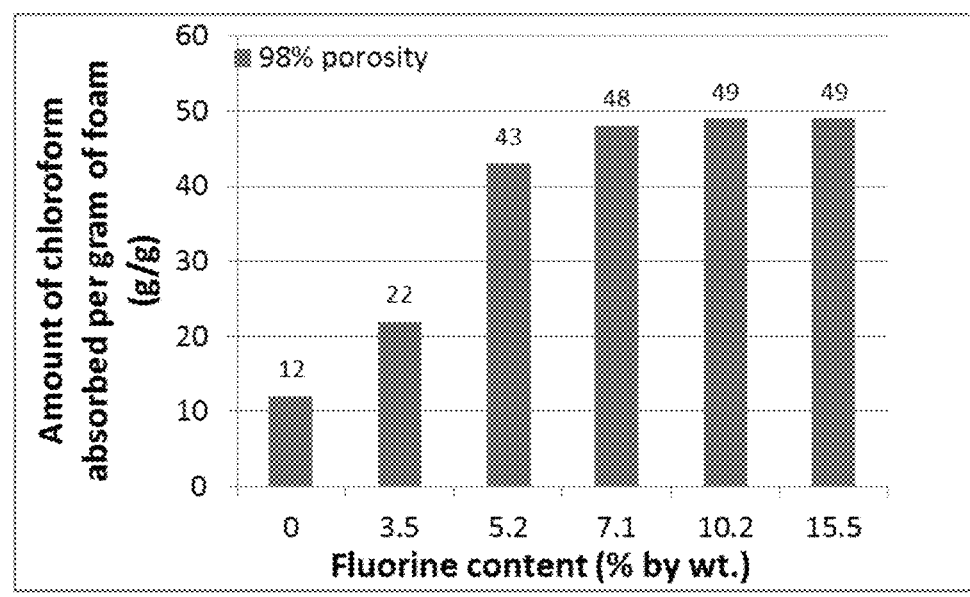
FIG. 9 The amount of chloroform absorbed out of a chloroform-water mixture, plotted as a function of the degree of fluorination.

In a typical procedure, a sheet of HA-carbon hybrid was fluorinated by vapors of chlorine trifluoride in a sealed autoclave reactor to yield fluorinated HA-carbon hybrid film. Different durations of fluorination time were allowed for achieving different degrees of fluorination. Sheets of fluorinated HA-carbon foam were then separately immersed in containers each containing a chloroform-water mixture. We observed that these foam sheets selectively absorb chloroform from water and the amount of chloroform absorbed increases with the degree of fluorination until the fluorine content reaches 7.2% by wt. (FIG. 9).

Example 8: Preparation of Nitrogenated HA-Carbon Foams

Several pieces of HA-carbon foam prepared in Example 3 were immersed in a 30% $H_2O_2$-water solution for a period of 2-48 hours to obtain oxidized HA-carbon foams, having a controlled oxygen content of 2-25% by weight.

Some oxidized HA-carbon foam samples were mixed with different proportions of urea and the mixtures were heated in a microwave reactor (900 W) for 0.5 to 5 minutes. The products were washed several times with deionized water and vacuum dried. The products obtained were nitrogenated HA-carbon foam. The nitrogen contents were from 3% to 17.5 wt. %, as measured by elemental analysis.

Figure 7:
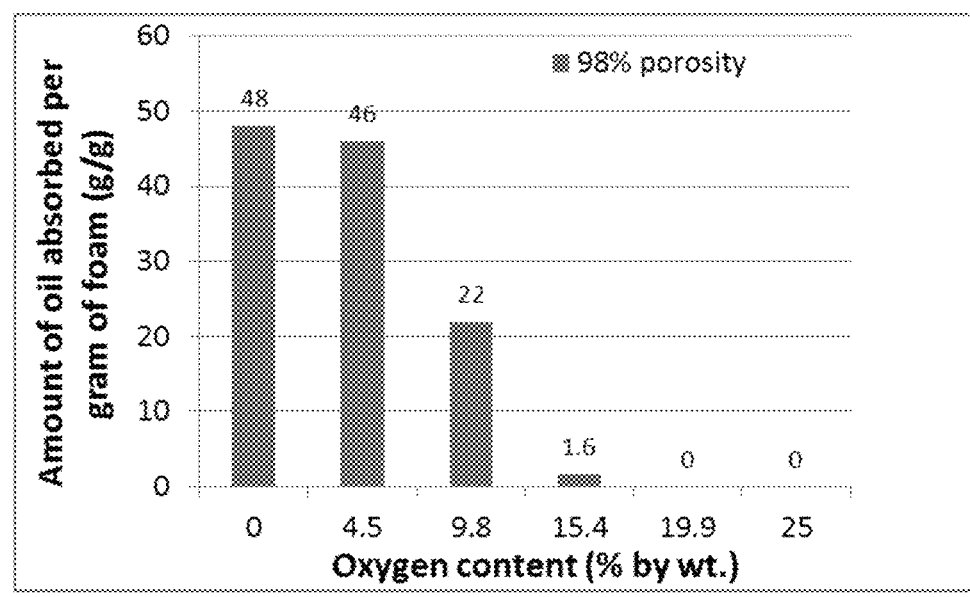
FIG. 7 The amount of oil absorbed per gram of integral 3D HA-carbon hybrid foam, plotted as a function of the oxygen content in the foam having a porosity level of approximately 98% (oil separation from oil-water mixture).
Figure 8:
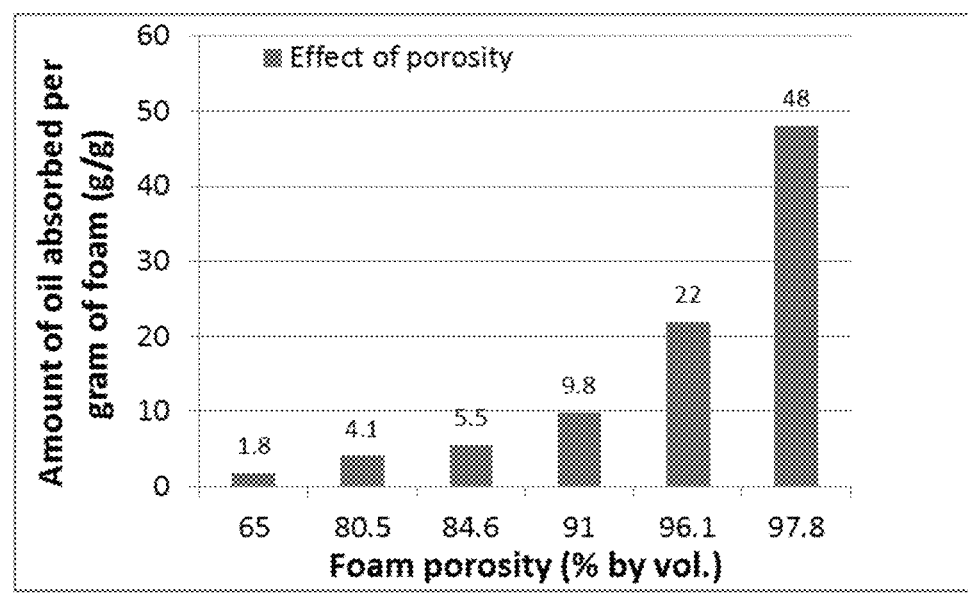
FIG. 8 The amount of oil absorbed per gram of integral 3D HA-carbon hybrid foam, plotted as a function of the porosity level (given the same oxygen content).

It may be noted that different functionalization treatments of the HA-carbon hybrid foam were for different purposes. For instance, oxidized HA-carbon hybrid foam structures are particularly effective as an absorber of oil from an oil-water mixture (i.e. oil spilled on water and then mixed together). In this case, the integral 3D HA (0-15% by wt. oxygen)-carbon foam structures are both hydrophobic and oleophilic (FIG. 7 and FIG. 8). A surface or a material is said to be hydrophobic if water is repelled from this material or surface and that a droplet of water placed on a hydrophobic surface or material will form a large contact angle. A surface or a material is said to be oleophilic if it has a strong affinity for oils and not for water.

Different contents of O, F, and/or N also enable the presently invented HA-carbon hybrid foams to absorb different organic solvents from water, or to separate one organic solvent from a mixture of multiple solvents.

Comparative Example 1: Graphene Via Hummer's Process and Carbonization of Graphene-Polymer Composite Graphite oxide as prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 A). A sample of this material was subsequently transferred to a furnace pre-set at 650° C. for 4 minutes for exfoliation and heated in an inert atmosphere furnace at 1200° C. for 4 hours to create a low density powder comprised of few-layer reduced graphene oxide (RGO). Surface area was measured via nitrogen adsorption BET. This powder was subsequently dry mixed at a 1%-25% loading level with ABS, PE, PP, and nylon pellets, respectively, and compounded using a 25 mm twin screw extruder to form composite sheets. These composite sheets were then pyrolyzed.

Comparative Example 2: Preparation of Single-Layer Graphene Oxide (GO) Sheets from Meso-Carbon Micro-Beads (MCMBs) and then Production of Graphene Foam Layers from GO Sheets Meso-carbon microbeads (MCMBs) were supplied from China Steel Chemical Co., Kaohsiung, Taiwan. This material has a density of about 2.24 $g/cm^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. Baking soda (5-20% by weight), as a chemical blowing agent, was added to the suspension just prior to casting. The suspension was then cast onto a glass surface. Several samples were cast, some containing a blowing agent and some not. The resulting GO films, after removal of liquid, have a thickness that can be varied from approximately 10 to 500 μm. Several sheets of the GO film, with or without a blowing agent, were then subjected to heat treatments that involve a heat temperature of 80-500° C. for 1-5 hours, which generated a graphene foam structure.

Comparative Example 3: Preparation of Pristine Graphene Foam (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication process (also known as the liquid-phase exfoliation in the art).

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N, N-Dinitroso pentamethylene tetramine or 4. 4'-Oxybis (benzenesulfonyl hydrazide) were added to a suspension containing pristine graphene sheets and a surfactant. The suspension was then cast onto a glass surface. Several samples were cast, including one that was made using $CO_2$ as a physical blowing agent introduced into the suspension just prior to casting. The resulting graphene films, after removal of liquid, have a thickness that can be varied from approximately 10 to 100 μm. The graphene films were then subjected to heat treatments at a temperature of 80-1,500° C. for 1-5 hours, which generated a graphene foam.

Comparative Example 4: CVD Graphene Foams on Ni Foam Templates

The procedure was adapted from that disclosed in open literature: Chen, Z. et al. "Three-dimensional flexible and conductive interconnected graphene networks grown by chemical vapor deposition," Nat. Mater. 10, 424-428 (2011). Nickel foam, a porous structure with an interconnected 3D scaffold of nickel was chosen as a template for the growth of graphene foam. Briefly, carbon was introduced into a nickel foam by decomposing $CH_4$ at 1,000° C. under ambient pressure, and graphene films were then deposited on the surface of the nickel foam. Due to the difference in the thermal expansion coefficients between nickel and graphene, ripples and wrinkles were formed on the graphene films. In order to recover (separate) graphene foam, Ni frame must be etched away. Before etching away the nickel skeleton by a hot HCl (or $FeCl_3$) solution, a thin layer of poly(methyl methacrylate) (PMMA) was deposited on the surface of the graphene films as a support to prevent the graphene network from collapsing during nickel etching. After the PMMA layer was carefully removed by hot acetone, a fragile graphene foam sample was obtained. The use of the PMMA support layer is critical to preparing a free-standing film of graphene foam; only a severely distorted and deformed graphene foam sample was obtained without the PMMA support layer. This is a tedious process that is not environmentally benign and is not scalable.

Comparative Example 5: Conventional Graphitic Foam from Pitch-Based Carbon Foams Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon.

Comparative Example 6: Graphene Foams from Hydrothermally Reduced Graphene Oxide For comparison, a self-assembled graphene hydrogel (SGH) sample was prepared by a one-step hydrothermal method. In a typical procedure, the SGH can be easily prepared by heating 2 mg/mL of homogeneous graphene oxide (GO) aqueous dispersion sealed in a Teflon-lined autoclave at 180° C. for 12 h. The SGH containing about 2.6% (by weight) graphene sheets and 97.4% water has an electrical conductivity of approximately $5 \times 10^{-3}$ S/cm. Upon drying and heat treating at 1,500° C., the resulting graphene foam exhibits an electrical conductivity of approximately $1.5 \times 10^{-1}$ S/cm, which is 2 times lower than those of the presently invented graphene foams produced by heat treating at the same temperature.

Example 9: Thermal and Mechanical Testing of Various Graphene Foams and Conventional Graphite Foam Samples from various conventional carbon or graphene foam materials were machined into specimens for measuring the thermal conductivity. The bulk thermal conductivity of meso-phase pitch-derived foam ranged from 67 W/mK to 151 W/mK. The density of the samples was from 0.31-0.61 g/cm$^3$. When weight is taken into account, the specific thermal conductivity of the pitch derived foam is approximately 67/0.31=216 and 151/0.61=247.5 W/mK per specific gravity (or per physical density).

The compression strength of the samples having an average density of 0.51 g/cm$^3$ was measured to be 3.6 MPa and the compression modulus was measured to be 74 MPa. By contrast, the compression strength and compressive modulus of the presently invented RHA-carbon foam samples having a comparable physical density are 6.1 MPa and 110 MPa, respectively.

Figure 4A:
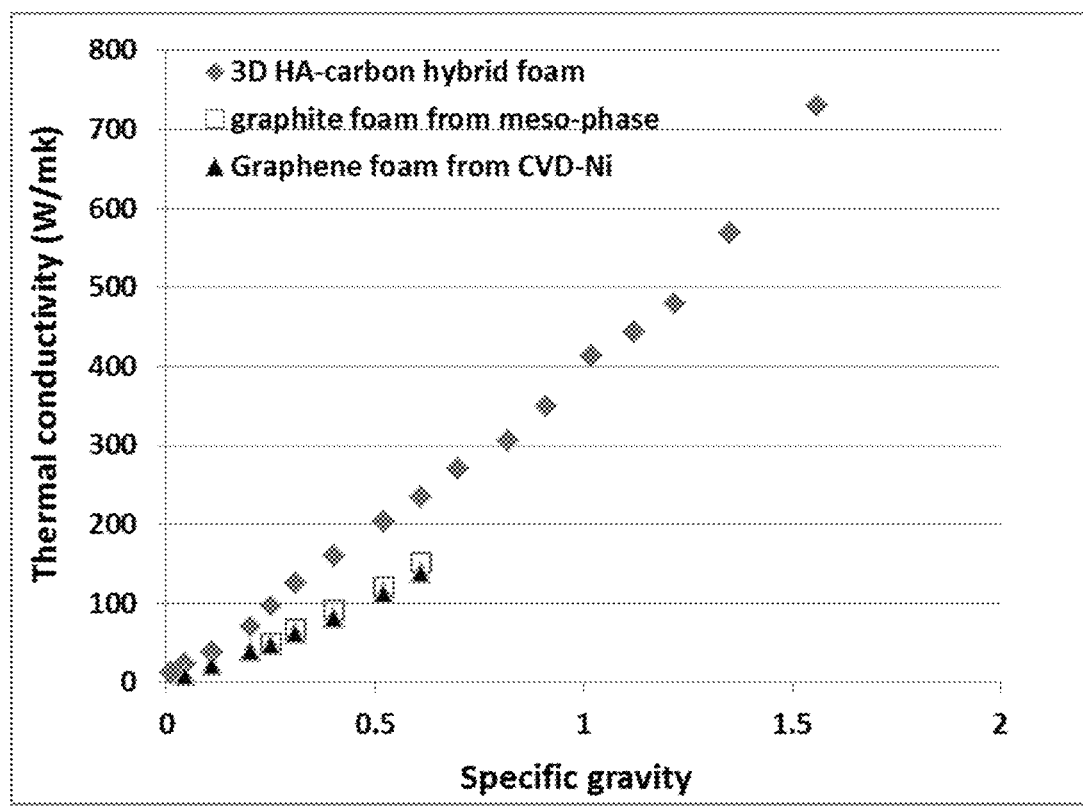
FIG. 4(A) Thermal conductivity values vs. specific gravity of a 3D integral HA-carbon foam produced by the presently invented process, a meso-phase pitch-derived graphite foam, and a Ni foam-template assisted CVD graphene foam.

Shown in FIG. 4(A) are the thermal conductivity values vs. specific gravity of the 3D HA-carbon foam, meso-phase pitch-derived graphite foam, and Ni foam template-assisted CVD graphene foam. These data clearly demonstrate the following unexpected results:

1) The 3D integral HA-carbon foams produced by the presently invented process exhibit significantly higher thermal conductivity as compared to both meso-phase pitch-derived graphite foam and Ni foam template-assisted CVD graphene, given the same physical density.
2) This is quite surprising in view of the notion that CVD graphene is essentially pristine graphene that has never been exposed to oxidation and should have exhibited a high thermal conductivity compared to our HA-carbon hybrid foam. The carbon phase of the hybrid foam is in general of low degree of crystallinity (some being amorphous carbon) and, thus, has much lower thermal or electrical conductivity as compared with graphene alone. However, when the carbon phase is coupled with RHA sheets to form an integral structure produced by the presently invented method, the resulting hybrid foam exhibits a higher thermal conductivity as compared to an all-pristine graphene foam. These exceptionally high thermal conductivity values observed with the RHA-carbon hybrid foams herein produced are much to our surprise. This is likely due to the observation that the otherwise isolated RHA sheets are now bonded by a carbon phase, providing a bridge for the uninterrupted transport of electrons and phonons.

3) The specific conductivity of the presently invented hybrid foam materials exhibits values from 250 to 500 W/mK per unit of specific gravity; but those of other types of foam materials are typically lower than 250 W/mK per unit of specific gravity.

Figure 5:
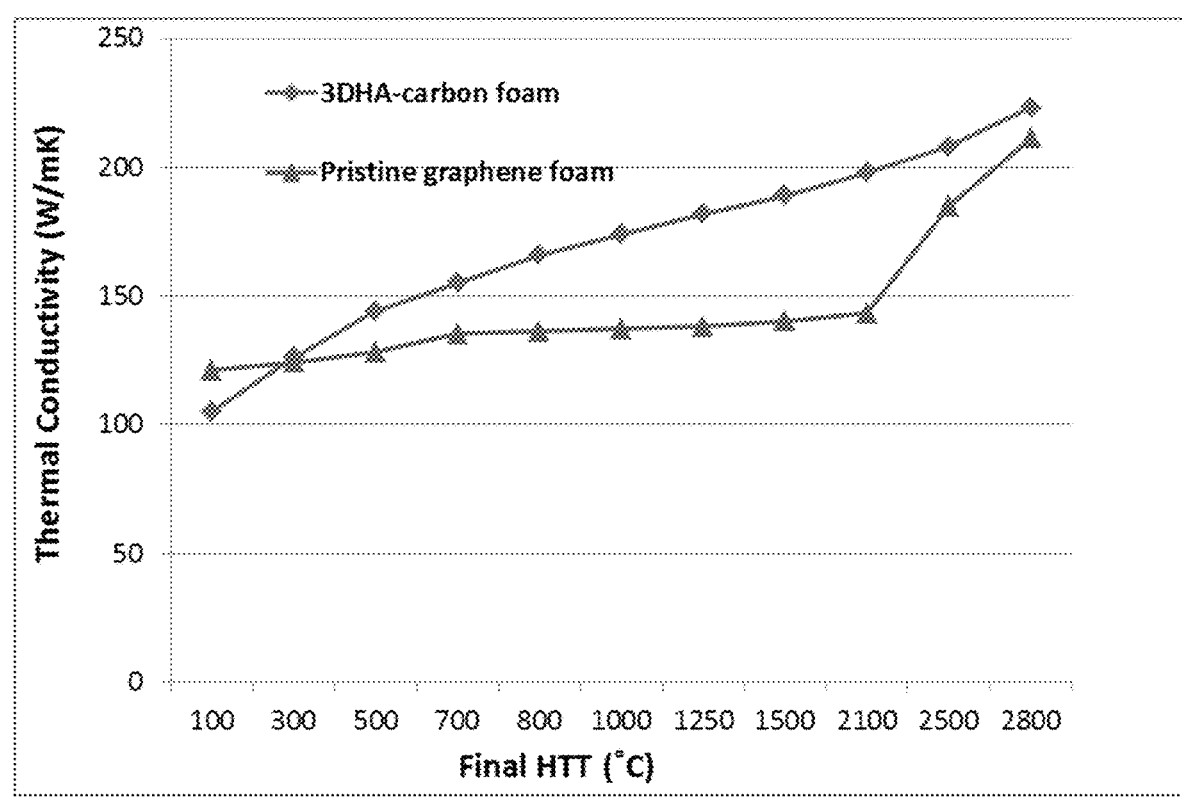
FIG. 5 Thermal conductivity values of 3D HA-carbon hybrid foam and pristine graphene foam (prepared by casting with a blowing agent and then heat treating) plotted as a function of the final (maximum) heat treatment temperature.

4) Summarized in FIG. 5 are thermal conductivity data for a series of 3D HA-carbon foams and a series of pristine graphene-derived foams, both plotted over the final (maximum) heat treatment temperatures. In both types of materials, the thermal conductivity increases monotonically with the final HTT. However, the presently invented process enables the cost-effective and environmentally benign production of HA-carbon foams that outperform pristine graphene foams. This is another unexpected result.

Figure 4B:
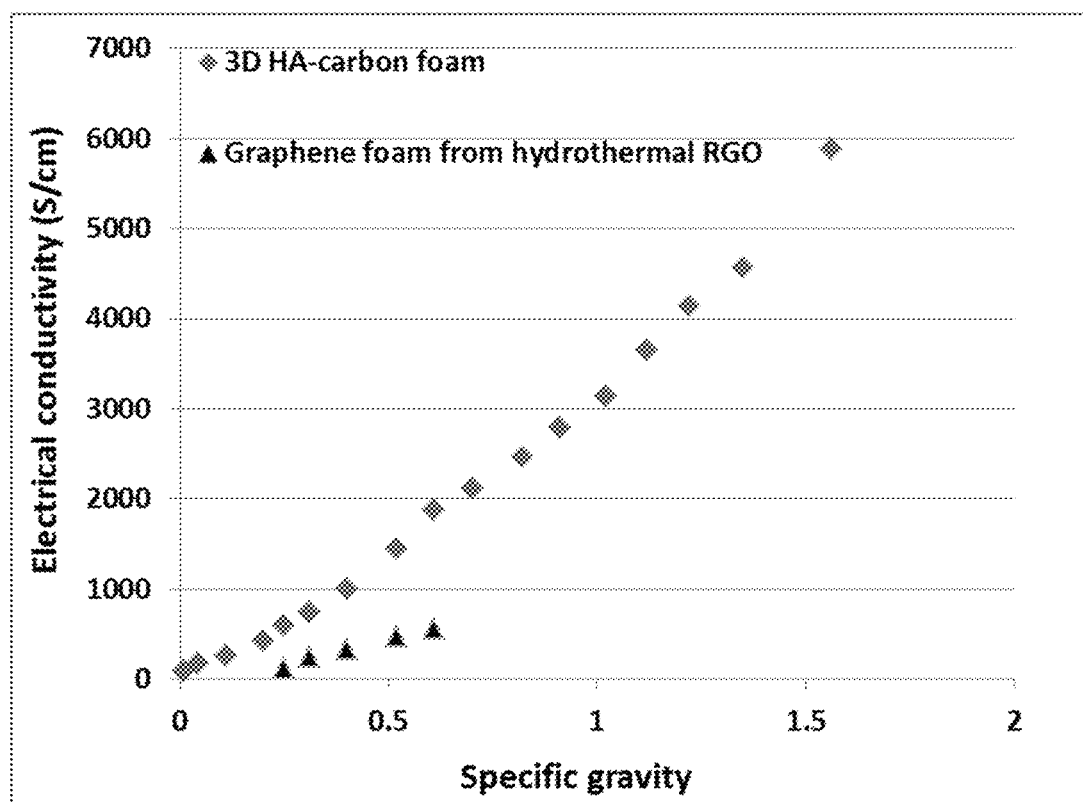
FIG. 4(B) Thermal conductivity values of 3D HA-carbon foam and the hydrothermally reduced GO graphene foam.
Figure 6:
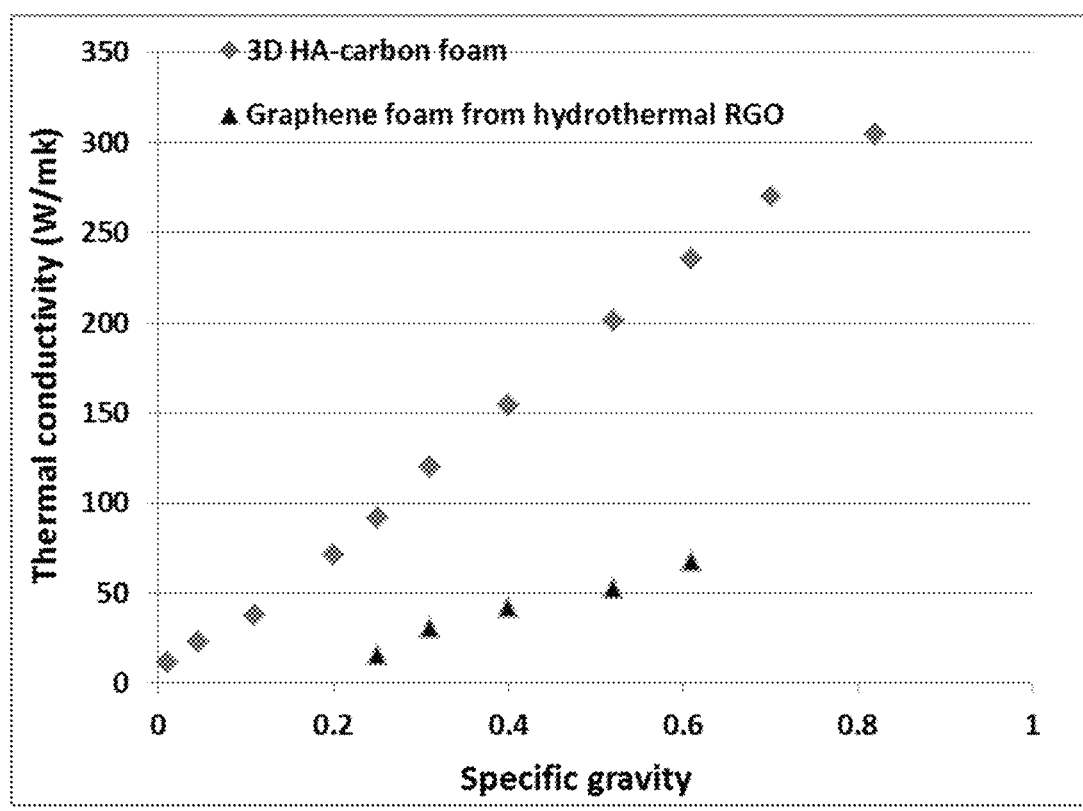
FIG. 6 Electrical conductivity values of 3D HA-carbon foam and the hydrothermally reduced GO graphene foam.

5) FIG. 4(B) shows the thermal conductivity values of the presently invented hybrid foam and hydrothermally reduced GO graphene foam. Electrical conductivity values of 3D HA-carbon foam and the hydrothermally reduced GO graphene foam are shown in FIG. 6. These data further support the notion that, given the same amount of solid material, the presently invented HA-carbon foam is intrinsically most conducting, reflecting the significance of continuity in electron and phonon transport paths. The carbon phase bridges the gaps or interruptions between HA sheets.

Example 10: Characterization of Various HA-Carbon Foams, Graphene Foams and Conventional Graphite Foam The internal structures (crystal structure and orientation) of several series of HA-carbon foam materials were investigated using X-ray diffraction. The X-ray diffraction curve of natural graphite typically exhibits a peak at approximately $2\theta=26°$, corresponds to an inter-graphene spacing ($d_{002}$) of approximately 0.3345 nm. The RHA walls of the hybrid foam materials exhibit a $d_{002}$ spacing typically from 0.3345 nm to 0.40 nm, but more typically up to 0.34 nm.

With a heat treatment temperature of 2,750° C. for the foam structure under compression for one hour, the $d_{002}$ spacing is decreased to approximately to 0.3354 nm, identical to that of a graphite single crystal. In addition, a second diffraction peak with a high intensity appears at $2\theta=55°$ corresponding to X-ray diffraction from (004) plane. The (004) peak intensity relative to the (002) intensity on the same diffraction curve, or the I(004)/I(002) ratio, is a good indication of the degree of crystal perfection and preferred orientation of graphene-like planes. The (004) peak is either non-existing or relatively weak, with the I(004)/I(002) ratio <0.1, for all graphitic materials heat treated at a temperature lower than 2,800° C. The I(004)/I(002) ratio for the graphitic materials heat treated at 3,000-3,250° C. (e.g., highly oriented pyrolytic graphite, HOPG) is in the range of 0.2-0.5. In contrast, a graphene foam prepared with a final HTT of 2,750° C. for one hour exhibits a I(004)/I(002) ratio of 0.78 and a Mosaic spread value of 0.21, indicating the pore walls being a practically perfect graphite single crystal with a good degree of preferred orientation (if prepared under a compression force).

The "mosaic spread" value is obtained from the full width at half maximum of the (002) reflection in an X-ray diffraction intensity curve. This index for the degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Some of our graphene foams have a mosaic spread value in this range of 0.3-0.6 when produced using a final heat treatment temperature no less than 2,500° C.

The following are a summary of some of the more significant results:

1) The presently invented HA-carbon hybrid foam materials typically exhibit significantly higher structural integrity (e.g. compression strength, elasticity, and resiliency) and higher thermal and electrical conductivities as compared to their graphene counterparts produced by the conventional, prior art methods.

2) It is of significance to point out that all the prior art processes for producing graphite foams or graphene foams appear to provide only macro-porous foams having a physical density in the range of approximately 0.2-0.6 g/cm$^3$, with pore sizes being typically too large (e.g. from 20 to 300 µm) for most of the intended applications. In contrast, the instant invention provides processes that generate HA-carbon foams having a density that can be as low as 0.001 g/cm$^3$ and as high as 1.7 g/cm$^3$. The pore sizes can be varied from microscopic (<2 nm), through meso-scaled (2-50 nm), and up to macro-scaled (e.g. from 1 to 500 µm). This level of flexibility and versatility in designing various types of HA-carbon foams is unprecedented and unmatched by any prior art process.

3) The presently invented method also allows for convenient and flexible control over the chemical composition (e.g. F, O, and N contents, etc.) of foams, responsive to various application needs (e.g. oil recovery from oil-contaminated water, separation of an organic solvent from water or other solvents, heat dissipation, etc.).

In conclusion, we have successfully developed an absolutely new, novel, unexpected, and patently distinct class of highly conducting humic acid-carbon hybrid foam materials, devices, and related processes of production. The chemical composition (% of oxygen, fluorine, and other non-carbon elements), structure (crystal perfection, grain size, defect population, etc.), crystal orientation, morphology, process of production, and properties of this new class of foam materials are fundamentally different and patently distinct from meso-phase pitch-derived graphite foam, CVD graphene-derived foam, and graphene foams from hydrothermal reduction of GO.

We claim:

1. A method of producing an integral 3D humic acid-carbon hybrid foam, said method comprising:
   (A) forming a solid shape of humic acid-polymer particle mixture, wherein said polymer particles are selected from solid particles of a rubber, semi-penetrating network polymer, penetrating network polymer, natural polymer, or a combination thereof; and
   (B) pyrolyzing said solid shape of humic acid-polymer particle mixture to thermally reduce said humic acid into reduced humic acid sheets and thermally convert said polymer into pores and carbon or graphite that bonds said reduced humic acid sheets to form said integral 3D humic acid-carbon hybrid foam.

2. The method of claim 1, wherein said step (A) comprises: (i) dispersing humic acid in water or a solvent to form a suspension and dispersing multiple polymer particles in said suspension to form a slurry; and (ii) dispensing said slurry and removing said water or solvent to form a solid shape of humic acid-polymer particle mixture, containing polymer particles being wrapped around or fully coated or embraced with humic acid.

3. A method of producing an integral 3D humic acid-carbon hybrid foam, said method comprising:
(A) forming a solid shape of humic acid-polymer particle mixture, wherein said polymer particles include plastic or rubber beads, pellets, spheres, wires, fibers, filaments, discs, ribbons, or rods, having a diameter or thickness from 10 nm to 10 mm, wherein said polymer particles contain a high carbon-yield polymer selected from phenolic resin, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof, or contain a low carbon-yield polymer selected from polyethylene, polypropylene, polybutylene, acrylonitrile-butadiene (ABS), polyvinyl alcohol, polytetrafluoroethylene (PTFE), poly methyl methacrylate (PMMA), a copolymer thereof, a polymer blend thereof, or a combination thereof; and
(B) pyrolyzing said solid shape of humic acid-polymer particle mixture to thermally reduce said humic acid into reduced humic acid sheets and thermally convert said polymer into pores and carbon or graphite that bonds said reduced humic acid sheets to form said integral 3D humic acid-carbon hybrid foam.

4. The method of claim 3, wherein said diameter or thickness is from 100 nm to 1 mm.

5. The method of claim 1, wherein said solid shape of humic acid-polymer particle mixture contains polymer particles that are wrapped around or coated by humic acid.

6. The method of claim 1, wherein said integral 3D humic acid-carbon hybrid foam is in a film, sheet, paper, filament, rod, powder, ingot, or bulk form.

7. The method of claim 1, wherein said step of pyrolyzing includes carbonizing said polymer particles at a temperature from 200° C. to 2,500° C. to obtain reduced humic acid-carbon foam, or carbonizing said polymer particles at a temperature from 200° C. to 2,500° C. to obtain reduced humic acid-carbon foam and then graphitizing said reduced humic acid-carbon foam from 2,500° C. to 3,200° C. to obtain graphitized humic acid-carbon foam.

8. The method of claim 1, wherein said step (A) includes melting said polymer particles to form a polymer melt mixture with humic acid sheets dispersed therein, forming said polymer melt mixture into a desired shape and solidifying said desired shape into a humic acid-polymer composite structure.

9. The method of claim 1, wherein said step (A) includes dissolving said polymer particles in a solvent to form a polymer solution mixture with humic acid sheets dispersed therein, forming said polymer solution mixture into a desired shape, and removing said solvent to solidify said desired shape into a humic acid-polymer composite structure.

10. The method of claim 2, wherein said step (A) includes forming said humic acid-coated polymer particles into a composite shape selected from a rod, sheet, film, fiber, powder, ingot, or block form.

11. A method of producing an integral 3D humic acid-carbon hybrid foam, said method comprising:
(A) forming a solid shape of humic acid-polymer particle mixture, wherein said step (A) includes compacting said humic acid-polymer particle mixture in a porous green compact having macroscopic pores and then infiltrating or impregnating said pores with an additional carbon source material selected from a petroleum pitch, coal tar pitch, an aromatic organic material, a monomer, an organic polymer, or a combination thereof, wherein said organic polymer contains a high carbon-yield polymer selected from poly furfuryl alcohol, polyacrylonitrile, polyimide, polyamide, polyoxadiazole, polybenzoxazole, polybenzobisoxazole, polythiazole, polybenzothiazole, polybenzobisthiazole, poly(p-phenylene vinylene), polybenzimidazole, polybenzobisimidazole, a copolymer thereof, a polymer blend thereof, or a combination thereof; and
(B) pyrolyzing said solid shape of humic acid-polymer particle mixture to thermally reduce said humic acid into reduced humic acid sheets and thermally convert said polymers into pores and carbon or graphite that bonds said reduced humic acid sheets to form said integral 3D humic acid-carbon hybrid foam.

12. The method of claim 2, wherein said step (A) includes forming a mass of said humic acid-coated or humic acid-embedded polymer particles into a compacted object.

13. The method of claim 12, wherein said compacted object is in a form selected from a rod, sheet, film, fiber, powder, ingot, or block.

* * * * *